(12) United States Patent
Moyal et al.

(10) Patent No.: US 11,551,689 B2
(45) Date of Patent: Jan. 10, 2023

(54) VOICE COMMAND EXECUTION

(71) Applicant: International Business Machines Corporation, Armonk, NY (US)

(72) Inventors: Shailendra Moyal, Pune (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 17/038,027

(22) Filed: Sep. 30, 2020

(65) Prior Publication Data

US 2022/0101845 A1    Mar. 31, 2022

(51) Int. Cl.
| | | |
|---|---|---|
| G10L 15/22 | (2006.01) | |
| G10L 15/18 | (2013.01) | |
| G10L 17/22 | (2013.01) | |
| G06F 21/35 | (2013.01) | |
| H04L 9/40  | (2022.01) | |

(52) U.S. Cl.
CPC .............. *G10L 15/22* (2013.01); *G10L 15/18* (2013.01); *G10L 17/22* (2013.01); *G06F 21/35* (2013.01); *G10L 2015/223* (2013.01); *G10L 2015/227* (2013.01); *H04L 63/0428* (2013.01)

(58) Field of Classification Search
CPC ...... G06F 21/35; G10L 15/22; H04L 63/0428
See application file for complete search history.

(56) References Cited

U.S. PATENT DOCUMENTS

| | | |
|---|---|---|
| 9,413,868 B2 | 8/2016 | Cronin |
| 10,032,451 B1 | 7/2018 | Mamkina |
| 2002/0002465 A1* | 1/2002 | Maes .................... G10L 15/065 704/E17.011 |
| 2007/0271596 A1* | 11/2007 | Boubion ................. G06F 21/77 726/3 |
| 2008/0148052 A1* | 6/2008 | Lindsley ............... H04L 9/3263 713/169 |

(Continued)

OTHER PUBLICATIONS

"Google Home And Alexa Talk to Each Other & Have a Conversation", Copyright © 2020 Voice2Biz.com, 4 pages, <https://www.voice2biz.com/google-home-and-alexa-talk-to-each-other-have-a-conversation/>.

(Continued)

*Primary Examiner* — Feng-Tzer Tzeng
(74) *Attorney, Agent, or Firm* — Randy E. Tejeda

(57) ABSTRACT

Embodiments of the present invention provide a computer system a computer program product, and a method that comprises analyzing a received voice command by identifying a plurality of contextual factors associated with at least one user in a plurality of users using a natural language processing algorithm; dynamically identifying the at least one user in the plurality of users based on an analysis of the identified contextual factors associated with the received voice command; transmitting the received voice command to another computing device within a plurality of computing devices associated with another user in the plurality of users; and generating a line of communication between the plurality of computing devices based on a correlation between a summation of a plurality of security factors and a predetermined threshold of risk associated with authenticating an identity of each user within the plurality of users.

14 Claims, 3 Drawing Sheets

(56) References Cited

U.S. PATENT DOCUMENTS

| | | | |
|---|---|---|---|
| 2011/0131406 A1* | 6/2011 | Jones | H04L 63/061 |
| | | | 713/150 |
| 2012/0036194 A1 | 2/2012 | Whynot | |
| 2014/0189840 A1* | 7/2014 | Metke | H04L 63/0815 |
| | | | 726/9 |
| 2017/0017501 A1 | 1/2017 | Quast | |
| 2017/0318075 A1 | 11/2017 | Liensberger | |
| 2018/0293989 A1 | 10/2018 | De | |
| 2019/0361719 A1 | 11/2019 | Vangala | |

OTHER PUBLICATIONS

"Patents Act 1977: Combined Search and Examination Report under Sections 17 and 18(3)", Reference: DP/P49637GB, Application No. GB2113553.8, dated May 26, 2022, 9 pages.

* cited by examiner

US 11,551,689 B2

VOICE COMMAND EXECUTION

BACKGROUND

The present invention relates generally to the field of voice command system technologies, and more specifically artificial intelligence voice assistance system technologies.

A microphone is a device that converts sounds into an electrical signal. Microphones are used in many applications such as telephones, hearing aids, public address systems for concert halls and public events, motion picture production, live and recorded audio engineering, sound recording, two-way radios, megaphones, radio and television broadcasting. They are also used in computers for recording voice, speech recognition, and for non-acoustic purposes such as ultrasonic sensors or knock sensors. Several types of microphone are used today, which employ different methods to convert the air pressure variations of a sound wave to an electrical signal. The most common are a dynamic microphone, which uses a coil of wire suspended in a magnetic field; the condenser microphone, which uses a vibrating diaphragm as a capacitor plate; and the contact microphone, which uses a crystal of piezoelectric material. Microphones typically need to be connected to a preamplifier before the signal can be recorded or reproduced.

A loudspeaker is an electroacoustic transducer; a device which converts an electric audio signal into a corresponding sound. The most widely used type of speaker is the dynamic speaker. The sound source (e.g., a sound recording or a microphone) must be amplified or strengthened with an audio power amplifier before the signal is sent to the speaker. The dynamic speaker operates on the same basic principle as a dynamic microphone, but in reverse, to produce sound from an electric signal. When an alternating current electrical audio signal is applied to its voice coil, a coil of wire suspended in a circular gap between the poles of a permanent magnet, the coil is forced to move rapidly back and forth due to Faraday's law of induction, which causes a diaphragm (usually conically shaped) attached to the coil to move back and forth, pushing on the air to create sound waves. Besides this most common method, there are several alternative technologies that can be used to convert an electrical signal into sound. Speakers are typically housed in a speaker enclosure, and this enclosure's materials and design play an important role in the quality of the sound. The enclosure generally must be as stiff and non-resonant as practically possible. Smaller loudspeakers are found in devices such as radios, televisions, portable audio players, computers, and electronic musical instruments. Larger loudspeaker systems are used for music, sound reinforcement in theatres and concert halls, and in public address systems.

SUMMARY

Embodiments of the present invention provide a computer system a computer program product, and a method that comprises analyzing a received voice command by identifying a plurality of contextual factors associated with at least one user in a plurality of users using a natural language processing algorithm; dynamically identifying the at least one user in the plurality of users based on an analysis of the identified contextual factors associated with the received voice command; transmitting the received voice command to another computing device within a plurality of computing devices associated with another user in the plurality of users; and generating a line of communication between the plurality of computing devices based on a correlation between a summation of a plurality of security factors and a predetermined threshold of risk associated with authenticating an identity of each user within the plurality of users.

DETAILED DESCRIPTION

Embodiments of the present invention recognize the need for an improvement to current voice recognition technology systems that are initiated by a wake-up command and authenticated by a single user associated with a voice recognition device. Currently, voice recognition technology systems require a user known by the device to submit an initiation command followed by a voice command, where the voice command can be an execution of a task or a search request. Generally, voice recognition technology systems do not communicate with voice recognition technology systems associated with other users that are not known. Furthermore, current voice recognition technology systems authenticate a single user's identity based on a voice identification at a given time. Embodiments of the present invention improve these voice recognition technology systems by allowing a user to transmit voice commands without the need for a wake-up command, dynamically authenticating multiple user's identities based on voice identification of known and unknown users by storing known user's voice identification and querying unknown voice user's within a voice database of possible users, and transmitting information between multiple voice recognition devices associated with multiple users without the need for multiple authentication steps allowing for multiple artificial intelligence devices to communicate with each other without the need of user input. Embodiments of the present invention provides these improvements to the voice identification technology systems that allow multiple artificial intelligence devices to communicate with each other without the need of user input by analyzing a voice command and defining individual security based on context of voice command, time or event based permission time of voice command, and place based permission of voice command. Embodiment of the present invention increases the efficiency of the communication between multiple artificial intelligence devices by receiving data, wherein the data is a voice command, analyzing the received voice command for a requested factor using an artificial intelligence voice assistance algorithm, dynamically identifying an appropriate user associated with the requested factor within a database of multiple users, transmitting the requested factor to the identified appropriate user, and allowing communication between multiple users associated with the requested factor.

Figure 1:
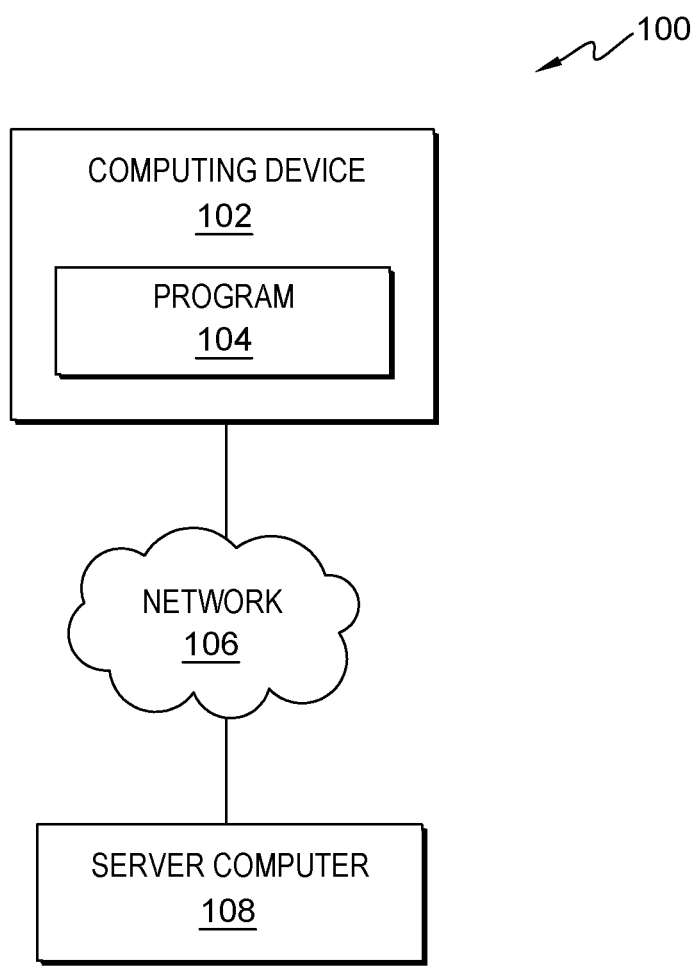
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 3.

The computing device may include a program 104. The program 104 may be a stand-alone program 104 on the computing device. In another embodiment, the program 104 may be stored on a server computing device 108. In this embodiment, the program 104 establishes communication between multiple artificial intelligence devices without the need of user input; providing information for a user in response to receiving request permission from the user associated with that particular artificial intelligence device; and determining an amount of access given to a different artificial intelligence device in response to authenticating the artificial intelligence device. In this embodiment, the program 104 receives data from at least one user, and the received data is a voice command. In this embodiment, the program 104 analyzes the received data for a factor associated with a request within the voice command using an artificial intelligence voice assistance algorithm. In this embodiment, the program 104 dynamically identifies a user associated with a requested contextual factor by comparing the received data to multiple entries of a database of data associated with multiple users. In this embodiment, the program 104 transmits the received data to another computing device associated with a different user based on the analysis of the received voice command and identified request factor. In another embodiment, the program 104 opens a line of communication between the multiple computing devices 102 associated with the multiple users associated with the identified request factor. For example, in response to user A executing a voice command to schedule a vacation aligned with user B, the program 104 generates communication between an artificial intelligence associated with user A and an artificial intelligence device associated with user b by accessing the vacation plan of user B, identifying contact information of user B from a directory, and initiating communication between the multiple artificial intelligence devices for user A to receive the required information from user B in response to user B providing permission to the artificial intelligence deice associated with user B.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network 106.

Figure 2:
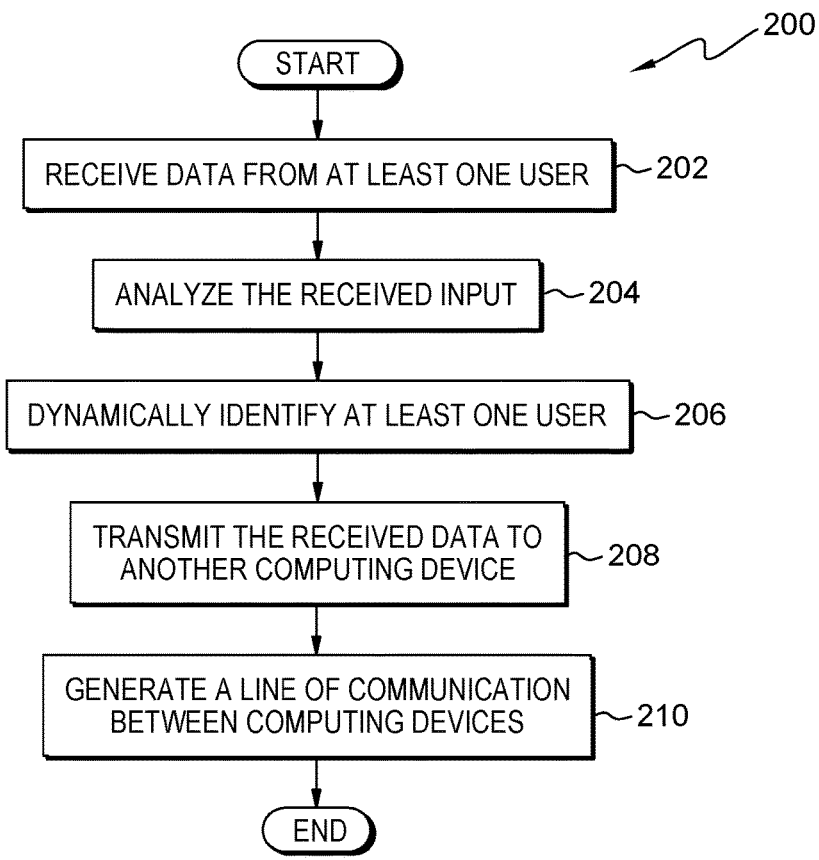
FIG. 2 is a flowchart illustrating operational steps for dynamically authenticating a voice command from multiple users, in accordance with at least one embodiment of the present invention.

FIG. 2 is a flowchart 200 illustrating operational steps for transmitting received voice commands associated with at least one user to another computing device association with another user.

In step 202, the program 104 receives data from at least one user. In this embodiment, the program 104 receives data from at least one user in a plurality of users, wherein the received data comprises a voice command. In this embodiment, the program 104 defines data as information from a user that represents a command. In this embodiment, the program 104 receives voice data, video data, image data, and textual data. In this embodiment, the program 104 receives a voice command associated with a performance of a future action. In this embodiment, the program 104 defines a voice command as an instruction transmitted to an artificial intelligence device, and this instruction is associated with the performance of a future action. In another embodiment, the program 104 receives a wake-up command prior to receiving any data from the user. For example, the program 104 receives a voice command to schedule a vacation for the user's family of 4 and coordinate that vacation with another user's vacation plans. In another example, the program 104 receives a voice command to make a reservation for user A and user B at a restaurant.

In step 204, the program 104 analyzes the received data. In this embodiment, the program 104 analyzes the received data for a contextual factor associated with the user by identifying an identity associated with the user based on the received voice command. In this embodiment, the program 104 identifies an identity associated with the user using a natural linguistic programming algorithm. In this embodiment, the program 104 defines a contextual factor as a factor that provides additional information to the received voice command. In this embodiment, the program 104 analyzes the received data for a request factor by using an artificial intelligence voice assistance algorithm. In this embodiment, the program 104 may receive voice commands when the user is not near the artificial intelligence device by pairing a mobile phone associated with the user to the artificial intelligence device to receive voice commands at any location. In this embodiment, the program 104 may transmit a transcript of the voice command to the paired mobile phone in response to receiving the voice command from the artificial intelligence device. For example, the program 104 analyzes the received voice command to identity the other users needed to complete the future performance, such as the other users associated with the future vacation plans.

In step 206, the program 104 dynamically identifies at least one user. In this embodiment, the program 104 dynamically identifies at least one user in the plurality of users based on an analysis of the received voice command by analyzing the received voice command associated with at least one user, identifying a plurality of indicative markers within the analysis of the received voice command, and matching the plurality of indicative markers based on the identified contextual factors associated with a user received voice command to a stored database of indicative markers associated with identifies of additional users using a natural linguistic programming algorithm and an artificial intelligence algorithm. In this embodiment, the program 104 defines indicative markers as signs or indications of an identity associated with a user. For example, the program 104 identifies speech pattern, bass, tremble, and accents as indicative markers. In this embodiment and in the event the plurality of indicative markers does not match the stored database of indicative markers, the program 104 generates a notification requesting permission to transmit the received voice command for the user associated with the artificial intelligence device. In this embodiment, the program 104 compares indicative markers associated with the identity of a user and the requested contextual factor based on at least one voice feature that is unique to an identified user using a neuro-linguistic programming algorithm. In another embodiment and in response to identifying the user, the program 104 identifies any reference associated with user, such as phone number, address, and security preferences. In this embodiment, the program 104 accesses a directory associated with a user and identifies an additional user based on the mobile number or identified voice recognition. For example, the program 104 dynamically identifies the received voice command came from user A and includes information from user B and user C to complete the future performance.

In step 208, the program 104 transmits the received data to another computing device 102. In this embodiment, the program 104 transmits the received voice command associated with a first user to another computing device 102 associated with a second user, where the second user is needed to complete the future performance associated with the received voice command. In this embodiment, the program 104 transmits the received voice command to a second computing device 102 in response to authenticating the identity of the first user. In another embodiment, the program 104 transmits the received voice command to the computing device 102 associated with the second user without authenticating the identity of the first user based on the contextual factors associated with the received voice command. For example, the program 104 transmits vacation information for user A to a computing device 102 associated with user B and another computing device 102 associated with user C due to the nature of the vacation information request including the vacation schedules of user B and user C.

In step 210, the program 104 generates a line of communication between computing devices 102 of the multiple identified users. In this embodiment and in response to transmitting the received voice command associated with the first user to the computing device 102 of the second user, the program 104 establishes communication between multiple artificial intelligence devices without authenticating the identity of every user by receiving security factor input from a user, identifying a type of communication that occurs between the multiple artificial intelligence devices, and aggregating the received security factor input from a plurality of user and the identified type of communication. This step will be further explained is FIG. 3. In this embodiment, the program 104 generates the line of communication between the plurality of computing devices based on a summation of a plurality of security factors meeting or exceeding a predetermined threshold of risk associated with authenticating an identity of each user within the plurality of users. In this embodiment, the open line allows the multiple users to determine the future performance of the action. In this embodiment, the program 104 determines an amount of information to be shared between the multiple users based on received user input. For example, the program 104 generates a communication line between the multiple computing devices associated with the multiple users and coordinates user A vacation plans with user B and user C vacation plans but does not provide shopping information.

Figure 3:
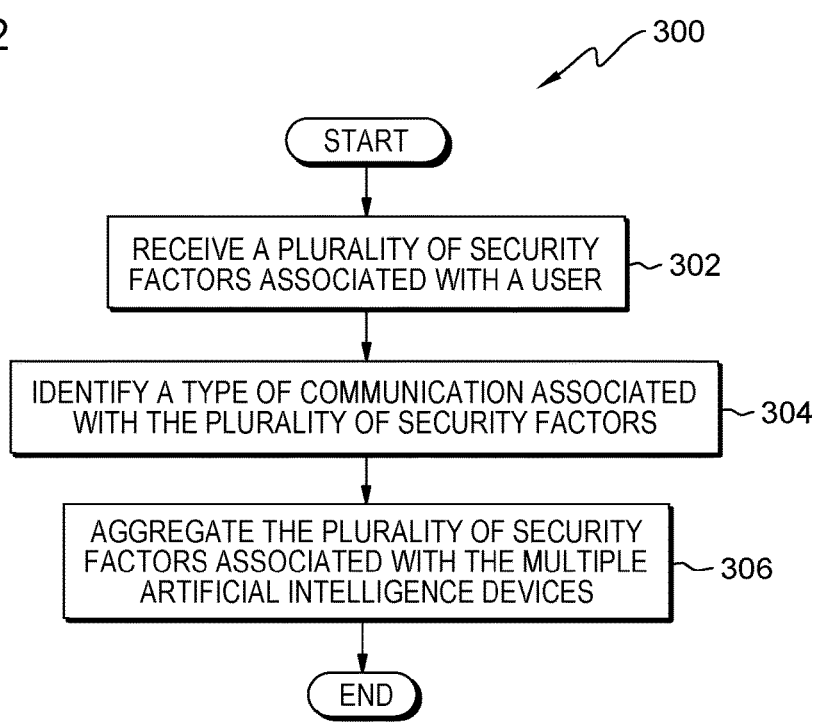
FIG. 3 is a flowchart illustrating operational steps for establishing communication between multiple artificial intelligence devices, in accordance with at least one embodiment of the present invention.

FIG. 3 is a flowchart 300 illustrating operational steps for generating a line of communication between a plurality of artificial intelligence devices without authenticating an identity of a user associated with an artificial intelligence device within the plurality of artificial intelligence devices, in accordance with at least one embodiment of the present invention.

In step 302, the program 104 receives a plurality of security factors associated with a user. In this embodiment and in response to executing a voice command on the artificial intelligence device, the program 104 prioritizes each security factor in the plurality of security factors associated with the user associated with the artificial intelligence device by assigning weight values to each security factor in the plurality of security factors and ranks each security factor in the plurality of security factors based on the assigned weight value, where the security factor with the highest weight value is placed at highest priority in the order and the security factor with the lowest weight value is placed at lower priority in the order. In this embodiment, the program 104 assigns weight values for each security factor based on a received user preference. For example, the program 104 defines information associated with finances as a security factor; information associated with time sensitive information as a security factor; and information associated with private user data as a security factor. In this embodiment, the program 104 defines the security factor as an indicative marker associated with a voice command that requires permission from the user prior to distributing the information. In this embodiment, the program 104 identifies the plurality of security factors for each user by receiving a security preference for each user, compiling the received security preferences or the plurality of users, and determining similarities and differences between the compiled security preferences using a machine learning algorithm and an artificial intelligence algorithm, wherein the plurality of security factors is based on a context of information, time-based permission information, event-based permission information, and place-based permission information. In this embodiment, the program 104 attaches a time component to the plurality of security factors, where the program 104 terminates the communication upon the expiration of the attached time component. For example, user B inputs that only food information will be shared for the next 20 minutes, or until the time user A communicates with reservation information.

In step 304, the program 104 identifies a type of communication associated with the plurality of security factors. In this embodiment, the program 104 determines which security factor in the plurality of security factors that is needed based on the identified type of communication. In this embodiment, the program 104 identifies the type of communication by analyzing the executed voice command for contextual language that indicates the type of communication using the natural linguistic programming algorithm. In this embodiment, the program 104 processes large amounts of natural language data and provides speech recognition, natural language understanding and natural language generation using the natural linguistic programming algorithm. For example, user A and user B are discussing a food reservation, and the program 104 identifies a food choice and food preference within the communication between the multiple artificial intelligence devices.

In step 306, the program 104 aggregates the plurality of security factors associated with the multiple artificial intelligence devices based on the identified type of communication. In this embodiment, the program 104 aggregates the values of each security factor in the plurality of security factors by identifying the prioritization of the security factors associated with each artificial intelligence device by assigning a weighted value (i.e., a range of 0-3 with 3 receiving the highest security preference from a user) to the highest ranked security factors, applying the prioritization of each security factor associated with each artificial intelligence device compiling the plurality of security factors into a totality of prioritized security factors using a machine learning algorithm and artificial intelligence algorithm, and synchronizing the totality prioritized security factors based on received user preferences associated with the plurality of users, wherein the synchronization requires permission from a user when an identified type of communication meets or exceeds a predetermined threshold of risk. In this embodiment and in response to the plurality of security factors meeting or exceeding the predetermined threshold of risk, the program 104 defines the relationship between the plurality of security factors and the predetermined threshold of risk as a correlation. In this embodiment, the program 104 defines the predetermined threshold of risk associated with the security factors is an aggregated assigned weight value of 5. In this embodiment, the program 104 requires authentication from a user associated with an artificial intelligence device that is receiving a voice command in response to the identified type of communication meeting or exceeding the predetermined threshold of risk.

For example, the program 104 identifies user A prioritizes time sensitive security factors over financial security factors, user B prioritizes geographical security factors over financial security factors and time sensitive security factors, and user C prioritizes financial security factors over time sensitive security factors and geographical security factors and applies the prioritization of received user preference associated with the plurality of users. In this example and in response to applying the prioritization, the program 104 compiles a totality of prioritized list with financial security factors as the highest security factor receiving an aggregated assigned weight value of 7 based on user A assigning this security factor a value of 2, user B assigning this security factor a value of 3, and user C assigning this security factor a value of 3, which aggregate to a total of 7; time sensitive security factors receiving an aggregated assigned weight value of 6 based on user A assigning this security factor a value of 3, user B assigning this security factor a value of 1, and user C assigning this security factor a value of 2, which aggregates to a total of 6; and geographical security factors receiving an aggregated assigned weight value of 4 based on user A assigning this security factor a value of 0, user B assigning this security factor a value of 3, and user C assigning this security factor a value of 1, which aggregates to a total of 4. In this example and in response to aggregating the values for each security factor in the plurality of security factors, the program 104 synchronizes the totality of prioritized security factors by generating notifications for the plurality of users detailing a presence of financial security factors and time sensitive security factors within the received voice command. In this example, the program 104 generates notifications to the plurality of users requesting authentication for the types of communication with aggregated security values that meet or exceed the predetermined threshold of risk, which here is 5; thus requiring authentication from the plurality of user regarding types of communication associated with the financial security factor and time sensitive security factor.

In this embodiment and in response to user failing to a place a security factor within their preference, the program 104 assigns a weight value of 0 to the absent security factor. In this embodiment, the program 104 does not increase the assigned weight value attached to a security factor in response to the user failing to prioritize any other security factor within the received user preference. In this embodiment, the program 104 transmits a request for authentication (i.e., permission) to the user associated with the artificial intelligence device receiving the voice command in response to the security factor associated with the type of communication for the received voice command meeting or exceeding the predetermined threshold of risk. In another embodiment, the program 104 generates a line of communication that allows other forms of data to be transmitted without the need of authentication, wherein these other forms of data include image data, video data, and audio data.

In this embodiment, the program 104 aggregates the plurality of security factors by synchronizing each respective user preference associated with each security factor. In this embodiment and in response to applying the prioritization of each security factor associated with each artificial intelligence and synchronizing the compilation of the plurality of security factors, the program 104 calculates an total security score for each security factor within the plurality of security factors based on assigned weight values for each security factor and complies a priority order that places the higher weighted security factors at a higher position across each artificial intelligence device associated with each user. For example, user A and user B ranks finances as their respective highest weighted security factor, thus the program 104 aggregates each voice command and the plurality of security factors associated with each user to reflect their respective security factors.

Figure 4:
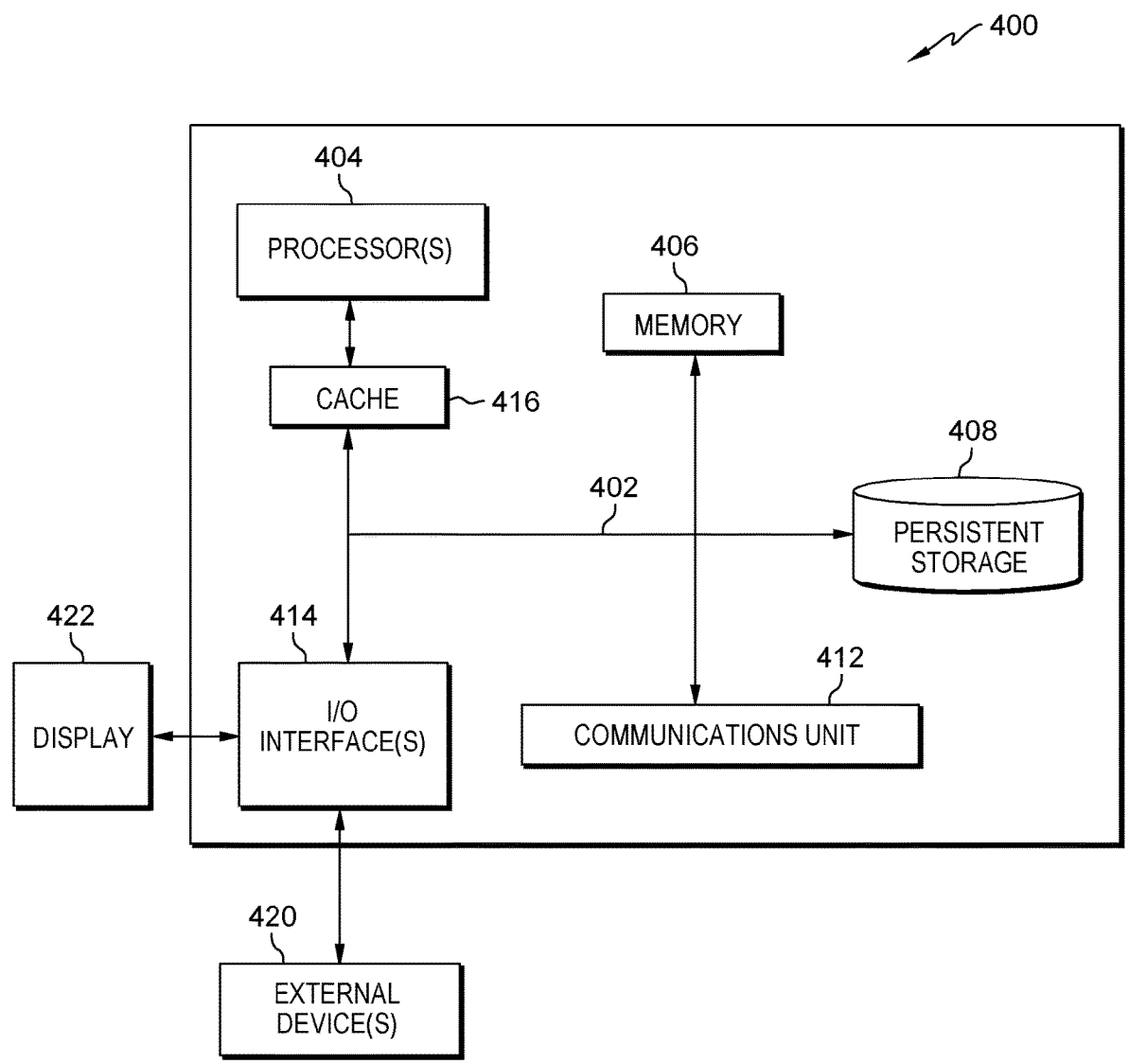
FIG. 4 depicts a block diagram of components of computing systems within a computing display environment of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 412, and an input/output (I/O) interface(s) 414. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. The program 104 may be downloaded to the persistent storage 408 through the communications unit 412.

The I/O interface(s) 414 allows for input and output of data with other devices that may be connected to a mobile device, an approval device, and/or the server computing device 108. For example, the I/O interface 414 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 414. The I/O interface(s) 414 also connect to a display 422.

The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   analyzing a received voice command by identifying a plurality of contextual factors associated with at least one user in a plurality of users using a natural language processing algorithm, wherein the at least one user is associated with a computing device;
   dynamically identifying the at least one user in the plurality of users based on an analysis of the identified contextual factors associated with the received voice command;
   transmitting the received voice command to another computing device within a plurality of computing devices associated with another user in the plurality of users; and
   generating a line of communication between the plurality of computing devices based on a correlation between an aggregation of a plurality of security factors and a predetermined threshold of risk associated with authenticating an identity of the at least one user within the plurality of users, comprising:
      identifying a type of communication associated with the received voice command that occurs between a plurality of artificial intelligence devices based on the plurality of security factors, wherein the type of communication is a topic associated with the communication;
      aggregating the plurality of security factors based on the identified type of communication, comprising:
         assigning weight values to each security factor in the plurality of security factors based on one or more preferences of the at least one user in the plurality of users; and
         prioritizing each security factor within the plurality of security factors associated with the at least one user in the plurality of users associated with each artificial intelligence device within the plurality of artificial intelligence devices by ranking each security factor in the plurality of security factors based on the assigned weight value;
      generating the line of communication between the plurality of computing devices based on the aggregation of the plurality of security factors.

2. The computer-implemented method of claim 1, wherein dynamically identifying the at least one user in the plurality of users comprises:
   identifying a plurality of indicative markers based on the analysis of the received voice command; and
   matching each indicative marker within the plurality of indicative markers to a respective stored indicative marker within a plurality of stored indicative markers based on the identified contextual factors associated with a user received voice command to a stored database of indicative markers associated with identities of additional users using a natural linguistic programming algorithm and an artificial intelligence algorithm.

3. The computer-implemented method of claim 1, wherein prioritizing each security factor within the plurality of security factors comprises:
   placing a security factor with a highest weight value at highest priority in the order; and
   placing a security factor with a lowest weight value at lower priority in the order.

4. The computer-implemented method of claim 1, wherein aggregating the received security factor input from the plurality of users based on the identified type of communication comprises:
   identifying a prioritization of the plurality of security factors associated with each artificial intelligence device by assigning a weighted value each security factor within the plurality of the security factors;
   compiling the plurality of security factors into a totality of prioritized security factors using a machine learning algorithm and artificial intelligence algorithm based on the identified prioritization of the plurality of security factors; and
   re-ranking the totality of prioritized security factors based on the compiled received security factor input of each user within the plurality of users.

5. The computer-implemented method of claim 1, further comprising generating a notification requesting authentication for an artificial intelligence device for a voice command that meets or exceeds a predetermined threshold of risk associated with the security factor of the plurality of security factors associated with a type of communication associated with the received voice command.

6. A computer program product comprising:
one or more computer readable storage media and program instructions stored on the one or more computer readable storage media, the program instructions comprising:
program instructions to analyze a received voice command by identifying a plurality of contextual factors associated with at least one user in a plurality of users using a natural language processing algorithm, wherein the at least one user is associated with a computing device;
program instructions to dynamically identify the at least one user in the plurality of users based on an analysis of the identified contextual factors associated with the received voice command;
program instructions to transmit the received voice command to another computing device within a plurality of computing devices associated with another user in the plurality of users; and
program instructions to generate a line of communication between the plurality of computing devices based on a correlation between an aggregation of a plurality of security factors and a predetermined threshold of risk associated with authenticating an identity of the at least one user within the plurality of users, comprising:
program instructions to identify a type of communication associated with the received voice command that occurs between a plurality of artificial intelligence devices based on the plurality of security factors, wherein the type of communication is a topic associated with the communication;
program instructions to aggregate the plurality of security factors based on the identified type of communication, comprising:
assigning weight values to each security factor in the plurality of security factors based on one or more preferences of at least one user in the plurality of users; and
prioritizing each security factor within the plurality of security factors associated with the at least one user in the plurality of users associated with each artificial intelligence device within the plurality of artificial intelligence devices by ranking each security factor in the plurality of security factors based on the assigned weight value; and
program instructions to generate the line of communication between the plurality of computing devices based on the aggregation of plurality of security factors.

7. The computer program product of claim 6, wherein the program instructions to dynamically identify the at least one user in the plurality of users comprise:
program instructions to identify a plurality of indicative markers based on the analysis of the received voice command; and
program instructions to match each indicative marker within the plurality of indicative markers to a respective stored indicative marker within a plurality of stored indicative markers based on the identified contextual factors associated with a user received voice command to a stored database of indicative markers associated with identities of additional users using a natural linguistic programming algorithm and an artificial intelligence algorithm.

8. The computer program product of claim 6, wherein the program instructions to prioritize each security factor within the plurality of security factors comprise:
program instructions to place a security factor with a highest weight value at highest priority in the order; and
program instructions to place a security factor with a lowest weight value at lower priority in the order.

9. The computer program product of claim 6, program instructions to aggregate the received security factor input from the plurality of users based on the identified type of communication comprise:
program instructions to identify a prioritization of the plurality of security factors associated with each artificial intelligence device by assigning a weighted value each security factor within the plurality of the security factors;
program instructions to compile the plurality of security factors into a totality of prioritized security factors using a machine learning algorithm and artificial intelligence algorithm based on the identified prioritization of the plurality of security factors; and
program instructions to re-rank the totality of prioritized security factors based on the compiled received security factor input of each user within the plurality of users.

10. The computer program product of claim 6, wherein the program instructions stored on the one or more computer readable storage media further comprise:
program instructions to generate a notification requesting authentication for an artificial intelligence device for a voice command that meets or exceeds a predetermined threshold of risk associated with the security factor of the plurality of security factors associated with a type of communication associated with the received voice command.

11. A computer system comprising:
one or more computer processors;
one or more computer readable storage media; and
program instructions stored on the one or more computer readable storage media for execution by at least one of the one or more processors, the program instructions comprising:
program instructions to analyze a received voice command by identifying a plurality of contextual factors associated with at least one user in a plurality of users using a natural language processing algorithm, wherein the at least one user is associated with a computing device;
program instructions to dynamically identify the at least one user in the plurality of users based on an analysis of the identified contextual factors associated with the received voice command;
program instructions to transmit the received voice command to another computing device within a plurality of computing devices associated with another user in the plurality of users; and
program instructions to generate a line of communication between the plurality of computing devices based on a correlation between an aggregation of a plurality of security factors and a predetermined threshold of risk associated with authenticating an identity of at least one user within the plurality of users, comprising:
program instructions to identify a type of communication associated with the received voice command that occurs between a plurality of artificial intelligence devices based on the plurality of security factors, wherein the type of communication is a topic associated with the communication;

program instructions to aggregate the plurality of security factors based on the identified type of communication, comprising:

assigning weight values to each security factor in the plurality of security factors based on one or more preferences of the at least one user in the plurality of users; and prioritizing each security factor within the plurality of security factors associated with the at least one user in the plurality of users associated with each artificial intelligence device within the plurality of artificial intelligence devices by ranking each security factor in the plurality of security factors based on the assigned weight value; and program instructions to generate the line of communication between the plurality of computing devices based on the aggregation of plurality of security factors.

12. The computer system of claim 11, wherein the program instructions to dynamically identify the at least one user in the plurality of users comprise:

program instructions to identify a plurality of indicative markers based on the analysis of the received voice command; and program instructions to match each indicative marker within the plurality of indicative markers to a respective stored indicative marker within a plurality of stored indicative markers based on the identified contextual factors associated with a user received voice command to a stored database of indicative markers associated with identities of additional users using a natural linguistic programming algorithm and an artificial intelligence algorithm.

13. The computer system of claim 11, wherein the program instructions to prioritize each security factor within the plurality of security factors comprise:

program instructions to place a security factor with a highest weight value at highest priority in the order; and program instructions to place a security factor with a lowest weight value at lower priority in the order.

14. The computer system of claim 11, program instructions to aggregate the received security factor input from the plurality of users based on the identified type of communication comprise:

program instructions to identify a prioritization of the plurality of security factors associated with each artificial intelligence device by assigning a weighted value each security factor within the plurality of the security factors;

program instructions to compile the plurality of security factors into a totality of prioritized security factors using a machine learning algorithm and artificial intelligence algorithm based on the identified prioritization of the plurality of security factors; and program instructions to re-rank the totality of prioritized security factors based on the compiled received security factor input of each user within the plurality of users.

* * * * *